US008896257B2

(12) United States Patent
Takada et al.

(10) Patent No.: US 8,896,257 B2
(45) Date of Patent: Nov. 25, 2014

(54) MOTOR CONTROL DEVICE AND OUT-OF-STEP DETECTING METHOD OF STEPPING MOTOR

(71) Applicant: Minebea Co., Ltd., Kitasaku-Gun, Nagano (JP)

(72) Inventors: Kazuo Takada, Kosai (JP); Takayuki Matsui, Toyohashi (JP); Scott Jacobs, Fukuroi (JP)

(73) Assignee: Minebea Co., Ltd., Nagano (JP)

( * ) Notice: Subject to any disclaimer, the term of this patent is extended or adjusted under 35 U.S.C. 154(b) by 31 days.

(21) Appl. No.: 13/771,500

(22) Filed: Feb. 20, 2013

(65) Prior Publication Data

US 2013/0229139 A1 Sep. 5, 2013

(30) Foreign Application Priority Data

Mar. 2, 2012 (JP) ................................. 2012-047001

(51) Int. Cl.
*H02P 8/00* (2006.01)
*G05B 19/40* (2006.01)
*H02P 8/38* (2006.01)

(52) U.S. Cl.
CPC ....................................... *H02P 8/38* (2013.01)
USPC .......................................... 318/696; 318/685

(58) Field of Classification Search
CPC ............... H02P 8/14; H02P 8/32; H02P 8/12; H02P 8/22
USPC .................................................. 318/685, 696
See application file for complete search history.

(56) References Cited

U.S. PATENT DOCUMENTS

| 6,087,798 | A * | 7/2000 | Ishida ........................... 318/696 |
| 8,072,177 | B2 * | 12/2011 | Arisawa ........................ 318/685 |
| 8,497,653 | B2 * | 7/2013 | Hioki et al. .................... 318/685 |
| 2002/0185926 | A1 * | 12/2002 | King et al. .................. 310/68 B |
| 2009/0256515 | A1 | 10/2009 | Takada et al. |
| 2012/0001584 | A1 | 1/2012 | Takada et al. |

FOREIGN PATENT DOCUMENTS

| JP | 2000-166297 A | 6/2000 |
| JP | 2005-039874 A | 2/2005 |
| JP | 2006-014440 A | 1/2006 |
| JP | 2009-261045 A | 11/2009 |
| JP | 2011-259525 A | 12/2011 |
| JP | 2012-016221 A | 1/2012 |

* cited by examiner

*Primary Examiner* — Eduardo Colon Santana
*Assistant Examiner* — Gabriel Agared
(74) *Attorney, Agent, or Firm* — Carrier Blackman & Associates, P.C.; William D. Blackman; Joseph P. Carrier (57) ABSTRACT

There is provided a motor control device configured to control an energization state of a coil of each phase for driving a stepping motor having multiple phase coils. The motor control device includes a measuring unit configured to measure a back electromotive voltage induced at a coil of a phase for which energization is stopped, among the multiple phase coils, an acquiring unit configured to acquire temperature information on temperature of the stepping motor or on temperature corresponding to the temperature of the stepping motor, and a detecting unit configured to detect whether the stepping motor is out of step or not based on a result obtained by the measuring unit and the temperature information acquired by the acquiring unit.

6 Claims, 4 Drawing Sheets

| TEMPERATURE | EQUAL TO OR LOWER THAN 5°C | HIGHER THAN 5°C AND LOWER THAN 75°C | EQUAL TO OR HIGHER THAN 75°C |
|---|---|---|---|
| THRESHOLD VALUE Va | Va1 | Va2 | Va3 |
| THRESHOLD VALUE Vb | Vb1 | Vb2 | Vb3 |
| THRESHOLD VALUE Vc | Vc1 | Vc2 | Vc3 |

MOTOR CONTROL DEVICE AND OUT-OF-STEP DETECTING METHOD OF STEPPING MOTOR

BACKGROUND OF THE INVENTION

1. Field of the Invention

The present invention relates to a motor control device and an out-of-step detecting method of a stepping motor, and particularly, to a motor control device and an out-of-step detecting method of a stepping motor that measure a back electromotive voltage to detect out-of-step.

2. Description of the Related Art

A stepping motor has various features and is widely used. That is, the stepping motor has a long life due to its structure where there is no mechanical contact between stators and rotors. Also, large static torque is obtained when the stepping motor is in an excited state.

In the stepping motor, so-called out-of-step may occur, and occurrence of out-of-step may become a problem. If a stepping motor becomes out of step, a rotor cannot rotate normally. The out-of-step may occur, for example, when the period of a pulse signal is short or a load is large.

In general, the stepping motor is used for controlling the angle or speed of rotation at high accuracy. Since the stepping motor manages a rotation position according to the number of pulses from a control side, if detection of out-of-step is late and only control progresses, the position of a gear or the like, that is a driving object, may deviate. Also, if detection of out-of-step is late, sound noise may be caused. Therefore, in order to perform an appropriate operation in a device or the like using a stepping motor, it is required to quickly detect occurrence of out-of-step.

When a stepping motor is out of step, it is necessary to quickly detect the out-of-step and to perform error processing such as stopping rotation or returning to a normal rotation state. Therefore, in the stepping motor, a circuit or system for detecting out-of-step and then performing error processing is additionally used.

JP-A-2009-261045 discloses the following out-of-step detecting method. That is, only for a short time having no influence on rotation of a stepping motor, a control current of a coil of each phase of the stepping motor is halted by turns phase by phase. Then, when the control current is halted, a back electromotive voltage is measured, and if the measurement result satisfies a predetermined out-of-step detection criterion, occurrence of out-of-step is detected.

JP-A-2012-16221 discloses a control method of a motor configured to set all coils, other than a coil whose back electromotive voltage is measured when a control current is halted, to a fixed voltage, in addition to a method as disclosed in JP-A-2009-261045.

JP-A-2011-259525 discloses a motor control device that measures the back electromotive voltage of a motor during rotation, thereby detecting a state regarding out-of-step of a stepping motor.

JP-A-2000-166297 discloses a drive device of a stepping motor that stops output of a drive pulse such that energization of an excitation coil of the stepping motor is stopped, if an out-of-step detecting circuit detects occurrence of out-of-step. In this drive device, it is disclosed to detect occurrence of out-of-step based on a voltage variation caused by a back electromotive voltage.

JP-A-2005-039874 discloses a control device of a stepping motor configured to supply an excitation current to the stepping motor by a preheating control unit such that the stepping motor does not rotate, when a temperature measured by a temperature sensor for measuring an environmental temperature is lower than a predetermined threshold temperature.

JP-A-2006-014440 discloses a motor drive control device that detects a temperature state of a load mechanism such as a driving roller or a driven roller that a motor drives, and sets a drive current of the motor based on the detected temperature state.

SUMMARY OF THE INVENTION

However, in a motor control device that measures a back electromotive voltage to detect out-of-step, as disclosed in JP-A-2009-261045 or JP-A-2012-16221, there has been found a problem that when a stepping motor is in a high temperature state or in a low temperature state, the accuracy of detection of out-of-step becomes worse. Any effective solutions to that problem are not disclosed in any of JP-A-2011-259525, JP-A-2000-166297, JP-A-2005-039874, and JP-A-2006-014440.

The present invention has been made in view of the above circumstances, and it is an object of the present invention to provide a motor control device and an out-of-step detecting method of a stepping motor capable of more reliably detecting out-of-step in a wide temperature range.

According to an aspect of the present invention, there is provided a motor control device controlling an energization state of a coil of each phase for driving a stepping motor having multiple phase coils. The motor control device comprises a measuring unit configured to measure a back electromotive voltage induced at a coil of a phase for which energization is stopped, among the multiple phase coils, an acquiring unit configured to acquire temperature information on temperature of the stepping motor or on temperature corresponding to the temperature of the stepping motor, and a detecting unit configured to detect whether the stepping motor is out of step or not based on a result obtained by the measuring unit and the temperature information acquired by the acquiring unit.

In the above motor control device, a portion of the motor control device or the entire motor control device may configure a control circuit, and temperature of the control circuit may be acquired as the temperature information by the acquiring unit.

In the above motor control device, the control circuit may be an integrated circuit.

In the above motor control device, the detecting unit may include a setting unit configured to set a detection criterion regarding out-of-step of the stepping motor according to the temperature information acquired by the acquiring unit, and a comparing unit configured to compare between the result obtained by the measuring unit and the detection criterion set by the setting unit, and the detecting unit may be configured to perform detection based on a result obtained by the comparing unit.

In the above motor control device, the setting unit may be configured to determine which one of at least two preset temperature ranges the temperature represented by the temperature information belongs to, and configured to set the detection criterion using a threshold value corresponding to the temperature range determined to include the temperature represented by the temperature information.

The above motor control device may further comprise a stopping unit configured, when a direction of a coil current flowing in a coil of a phase of the multiple phase coils is switched, to temporarily stops application of a voltage to the coil, and in a stop period when the application of the voltage is stopped by the stopping unit, a back electromotive voltage induced at the coil may be measured by the measuring unit.

According to another aspect of the present invention, there is provided an out-of-step detecting method of a stepping motor having multiple phase coils, the method comprising: measuring a back electromotive voltage induced at a coil of a phase for which energization is stopped, among the multiple phase coils; acquiring temperature information on temperature of the stepping motor, or temperature corresponding to the temperature of the stepping motor; and detecting whether the stepping motor is out of step based on a result obtained by the measuring step and the acquired temperature information.

According to the above configuration, it is detected whether stepping motor is out of step or not based on the back electromotive voltage induced at the coil for which energization is stopped and the temperature information corresponding to at least one of the temperature of the stepping motor and the temperature of the motor control device. Therefore, it is possible to provide a motor control device and an out-of-step detecting method of a stepping motor capable of more reliably detecting whether out-of-step is occurred in a wide temperature range.

DETAILED DESCRIPTION

Hereinafter, a motor control device according to an illustrative embodiment of the present invention will be described.

The motor control device is configured to drive a stepping motor having multiple phase coils. The motor control device controls the energization state of a coil of each phase for driving the stepping motor. In the present illustrative embodiment, the motor control device includes a driving circuit that energizes the coils of the stepping motor, and a control circuit that controls the driving circuit. In other words, a portion of the motor control device configures the control circuit.

The motor control device and the stepping motor driven by the motor control device configure the motor drive device. In the motor drive device, a driving electric power is supplied from the driving circuit to the stepping motor based on an electric power supplied from a power source, so that the stepping motor is driven. In the motor drive device, the driving circuit is controlled by the control circuit, so that driving of the stepping motor is controlled.

Figure 1:
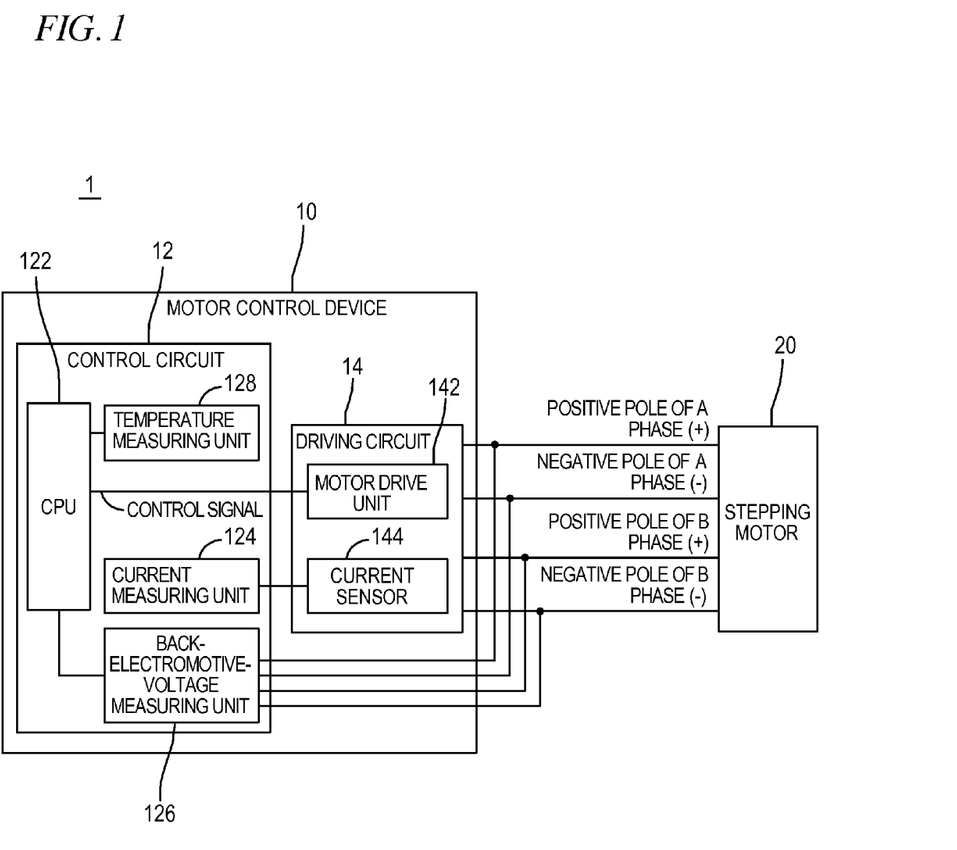
FIG. 1 is a block diagram showing a configuration of a motor control device according to an illustrative embodiment of the present invention.

FIG. 1 is a block diagram showing a configuration of a motor drive device according to an illustrative embodiment of the present invention.

As shown in FIG. 1, a motor drive device 1 includes a motor control device 10 and a stepping motor 20. The stepping motor 20 is driven, for example, by 2-phase excitation of A phase and B phase. The stepping motor 20 includes a coil of A phase and a coil of B phase (shown in FIG. 2). Electric power is supplied from the motor control device 10 to a coil of each phase, so that the stepping motor 20 is driven. The stepping motor 20 is used, for example, as an actuator for an air conditioner mounted on a vehicle. The usage of the stepping motor 20 and the motor drive device 1 are not limited thereto.

The motor control device 10 includes a control circuit 12 and a driving circuit 14.

The driving circuit 14 includes a motor drive unit 142 and a current sensor 144. The driving circuit 14 supplies an electric power to the stepping motor 20 to drive the stepping motor 20.

The control circuit 12 includes a central processing unit (CPU: an example of a detecting unit, a setting unit, and a comparing unit) 122, a current measuring unit 124, a back-electromotive-voltage measuring unit (an example of a measuring unit) 126, and a temperature measuring unit (an example of an acquiring unit) 128. The control circuit 12 controls the driving circuit 14 to control driving of the stepping motor 20. In the present illustrative embodiment, the control circuit 12 is packaged as an integrated circuit (IC).

The motor drive unit 142 is a module that applies a voltage to a coil of each phase of the stepping motor 20. The motor drive unit 142 receives a control signal from the CPU 122. The motor drive unit 142 applies a voltage based on the control signal. In the present illustrative embodiment, the driving circuit 14 and the stepping motor 20 are connected by four lines including a positive pole of A phase, a negative pole of A phase, a positive pole of B phase, and a negative pole of B phase. According to the control signal, the motor drive unit 142 supplies an electric power to the stepping motor 20 through each line of those lines.

The current sensor 144 is a module that senses a current (coil current) flowing in a coil of each phase of the stepping motor 20. The current sensor 144 outputs a result of the sensing of the coil current to the current measuring unit 124.

The current measuring unit 124 is a module that measures the coil current of the stepping motor 20. The current measuring unit 124 receives a result of the sensing of the coil current output from the current sensor 144. The current measuring unit 124 measures the coil current based on the received sensing result. The current measuring unit 124 outputs a result of the measuring of the coil current to the CPU 122.

The back-electromotive-voltage measuring unit 126 is a module that measures a back electromotive voltage induced in a coil of each phase of the stepping motor 20. In the present illustrative embodiment, the back-electromotive-voltage measuring unit 126 is connected to each of the four lines connecting the driving circuit 14 and the stepping motor 20. The back-electromotive-voltage measuring unit 126 outputs a result of the measuring of the back electromotive voltage to the CPU 122.

The temperature measuring unit 128 is, for example, a temperature sensor that measures the temperature of the IC of the control circuit 12. The temperature measuring unit 128 outputs temperature information representing the temperature of the control circuit 12, to the CPU 122.

The CPU 122 receives the result of the measuring of the coil current output from the current measuring unit 124, the result of the measuring of the back electromotive voltage output from the back-electromotive-voltage measuring unit 126, and the temperature information output from the temperature measuring unit 128. The CPU 122 generates a control signal for controlling a voltage applied to the stepping motor 20. In a case of driving the stepping motor 20, the CPU 122 generates the control signal based on the result of the measuring of the coil current. The CPU 122 outputs the generated control signal to the motor drive unit 142.

Figure 2:
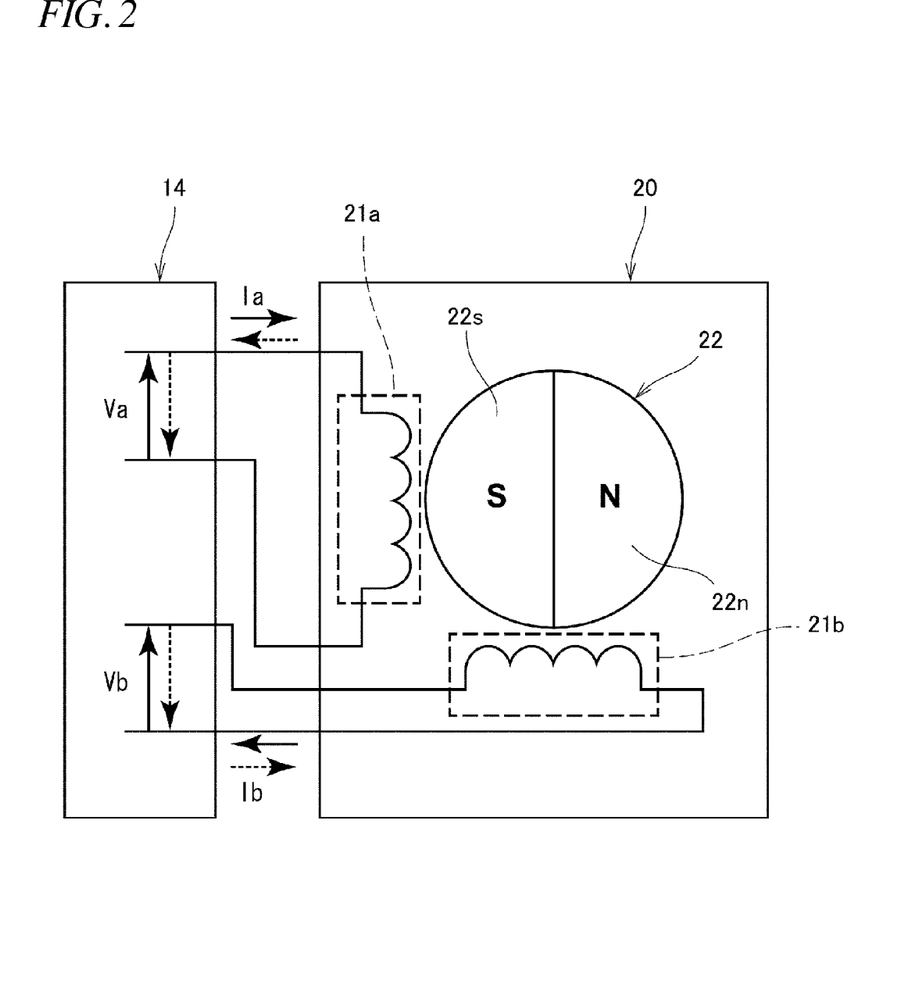
FIG. 2 is a view schematically showing a circuit configuration of a stepping motor.

FIG. 2 is a view schematically showing the circuit configuration of the stepping motor 20.

As shown in FIG. 2, the stepping motor 20 includes two coils 21a and 21b, a rotor 22, and a plurality of stator yokes (not shown).

The coils 21a and 21b are coils that excite the stator yokes, respectively. Each of the coils 21a and 21b is connected to the driving circuit 14. The coil 21a is the coil of A phase. The coil 21b is the coil of B phase. In the coils 21a and 21b, coil currents of different phases flow, respectively.

The rotor 22 has a permanent magnet, magnetized into multiple poles such that a south pole 22s and a north pole 22n are alternately reversed, along a circumferential direction. Also, in FIG. 2, the rotor 22 is simplified to have one south pole 22s and one north pole 22n. The stator yokes are disposed close to the outer circumferential portion of the rotor 22, around the rotor 22. The phase of a coil current flowing in each of the coils 21a and 21b is periodically switched, so that the rotor 22 rotates.

In the present illustrative embodiment, when the stepping motor 20 is driven, the CPU 122 and the motor drive unit 142 apply a pulse-width modulated pulse voltage to each of the coils 21a and 21b.

The stepping motor 20 is driven as follows. That is, a pulse voltage is applied to the coil 21a such that the polarity of a coil current $I_a$ (that is, the direction of the coil current $I_a$) changes with a predetermined period (a coil voltage $V_a$). Meanwhile, a pulse voltage is applied to the coil 21b with the same period as that of the coil 21a (a coil voltage $V_b$). The pulse voltage is applied to the coil 21b such that the polarity of a coil current $I_b$ (that is, the direction of the coil current $I_b$) changes later than the coil current $I_a$ by a predetermined amount of phase.

If the coil currents $I_a$ and $I_b$ flow in the coils 21a and 21b, respectively, the stator yokes of the coils 21a and 21b are excited according to the polarities of the coil currents $I_a$ and $I_b$. As a result, the rotor 22 rotates in a predetermined step unit.

Here, the motor control device 10 has a function of detecting whether out-of-step is occurred in the stepping motor 20 (whether the stepping motor is out of step) by an out-of-step detecting method as will be described below. The CPU 122 uses the individual units of the control circuit 12 to perform processes, thereby implementing that function. That function and an operation when it is detected that out-of-step is occurred in the stepping motor 20 will be described below.

In the present illustrative embodiment, whether out-of-step of the stepping motor 20 is occurred is detected when the CPU 122 is performing a driving process of driving the stepping motor 20. The driving process is repeated from when the driving of the stepping motor 20 starts to when the driving of the stepping motor 20 stops. The detection is performed based on the back electromotive voltage measured by the back-electromotive-voltage measuring unit 126 and the temperature information acquired by the temperature measuring unit 128. The detection is performed based on an out-of-step detection threshold value (that is an example of a detection criterion) set as follows.

First, the flow of the out-of-step detecting method that the CPU 122 performs will be described schematically.

Figure 3:
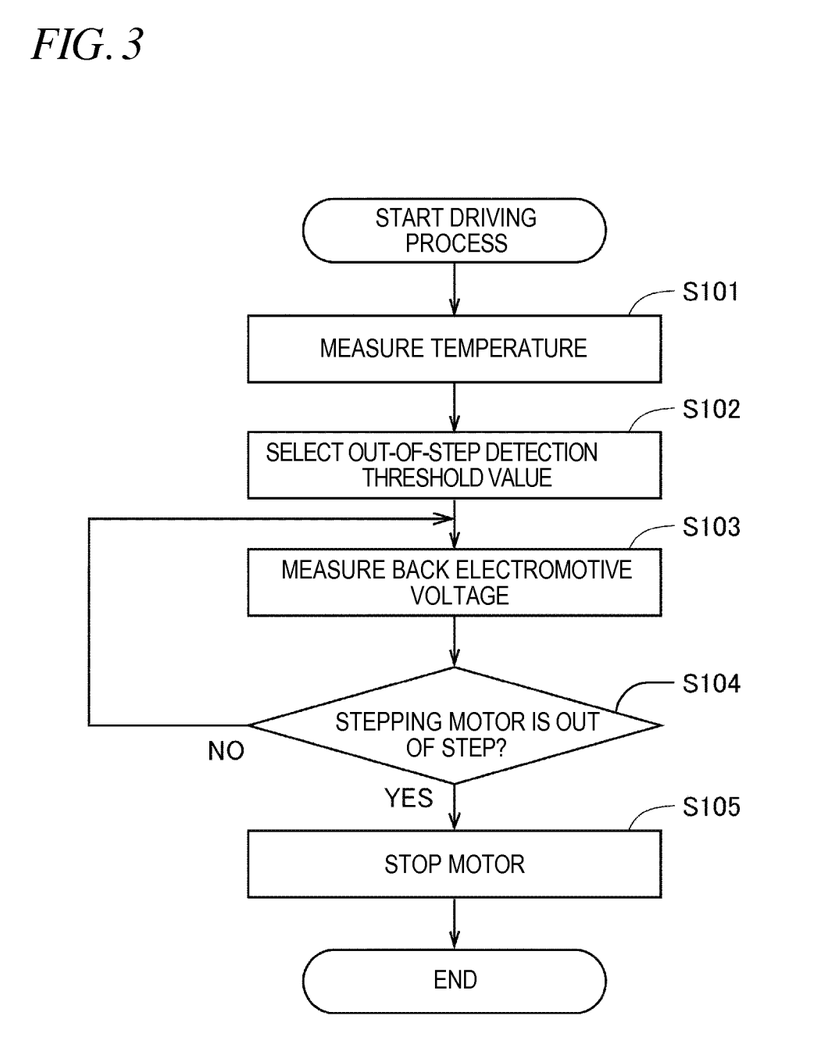
FIG. 3 is a flow chart showing an out-of-step detecting method according to the illustrative embodiment.

FIG. 3 is a flow chart showing an out-of-step detecting method according to the present illustrative embodiment.

If the driving process starts, in Step S101, the CPU 122 performs temperature measurement by the temperature measuring unit 128. As a result, the temperature information is acquired.

In Step S102, the CPU 122 selects and sets the out-of-step detection threshold value based on the acquired temperature information.

In Step S103, the CPU 122 measures the back electromotive voltage by the back-electromotive-voltage measuring unit 126.

In Step S104, the CPU 122 detects whether the stepping motor 20 is out of step or not. If it is not detected that the stepping motor 20 is out of step, the CPU 122 repeats Step S103 of measuring the back electromotive voltage and Step S104 of detecting whether the stepping motor 20 is out of step.

If it is detected in Step S104 that the stepping motor 20 is out of step, in Step S105, the CPU 122 performs a process of stopping the stepping motor 20. If the stepping motor 20 is stopped, the driving process of the stepping motor 20 ends.

Here, in the above-mentioned process of Step S103, the back electromotive voltage is measured as follows. When the direction of the coil current $I_a$ or $I_b$ flowing in a coil 21a or 21b of any one phase of A phase and B phase is switched, the CPU 122 temporarily stops application of the pulse voltage to the coil current $I_a$ or $I_b$ (stop period). Then, in this stop period, the back-electromotive-voltage measuring unit 126 measures the back electromotive voltage induced at the phase coil 21a or 21b where the pulse voltage is not applied, individually, (for each phase, or for each coil).

That is, when the polarity of the coil current $I_a$ changes, the application of the pulse voltage to the coil 21a is stopped such that the coil current $I_a$ becomes zero. In this stop period, the back electromotive voltage is induced at the coil 21a. Also, when the polarity of the coil current $I_b$ changes, the application of the pulse voltage to the coil 21b is stopped such that the coil current $I_b$ becomes zero. In this stop period, the back electromotive voltage is induced at the coil 21b. The back-electromotive-voltage measuring unit 126 measures these back electromotive voltages.

More specifically, during driving of the stepping motor 20, the pulse voltages are applied to the coils 21a and 21b by control of the CPU 122 (PMW control). Accordingly, the coil currents $I_a$ and $I_b$ flow in the coils 21a and 21b, respectively.

The PWM is controlled, and then, an energization stopping process and constant voltage control are performed. For example, when the energization stopping process of the coil 21a is performed, the application of the pulse voltage to the coil 21a is stopped only for a predetermined stop period. As a result, the coil current $I_a$ becomes zero. The stop period is arbitrarily set by the CPU 122. For example, the CPU 122 may set a predetermined stop period, or may receive setting of a stop period from the outside of the motor drive device 1. In this stop period, the back-electromotive-voltage measuring unit 126 measures the back electromotive voltage induced at the coil 21a. The result of the measuring is supplied to the CPU 122.

Also, according to the present illustrative embodiment, when the energization stopping process is performed on the coil 21a as described above, the CPU 122 sets the coil voltage $V_b$ of the coil 21b to a fixed voltage in the stop period, as the constant voltage control. That is, in the stop period, the CPU 122 sets all coils other than the coil where the back electromotive voltage is measured, to a fixed voltage. The voltage level of the fixed voltage may have the same voltage level as that of a previous coil voltage (for example, a power supply voltage level, a ground (GND) level, or the like), or may have a predetermined reference voltage level. Therefore, for example, when the energization stopping process is performed on the coil 21a, the coil voltage $V_b$ of the coil 21b becomes constant (for example, the power supply voltage level in the present illustrative embodiment).

When the voltage level of the fixed voltage is the power supply voltage level, the coil current $I_b$ of the coil 21b in a case where the energization stopping process is performed on the coil 21a slightly rises as compared to the coil current $I_b$ in the period when the above-mentioned PWM is being controlled. Since the coil voltage $V_b$ in the stop period is constant, noise according to the application of the coil voltage $V_b$ does not occur. As a result, noise does not overlap the coil voltage $V_a$ of the coil 21a in the stop period. That is, the coil voltage $V_a$ in the stop period is measured, so that the back electromotive voltage induced at the coil 21a is accurately measured. Therefore, it is possible to prevent erroneous detection of out-of-step.

If the back electromotive voltage is measured as described above, in Step S104, the CPU 122 determines whether the back electromotive voltage satisfies a predetermined out-of-step detection criterion, that is, whether the back electromotive voltage reaches the out-of-step detection threshold value set in Step S102. That is, the CPU 122 compares the value of the acquired back electromotive voltage with the out-of-step detection threshold value. It is possible to detect whether out-of-step is occurred in the stepping motor 20 or not based on the result of the comparison. For example, when the value of the measured back electromotive voltage reaches the out-of-step detection threshold value, the CPU 122 detects that out-of-step is occurred in the stepping motor 20.

Next, setting of the out-of-step detection threshold value based on the temperature information will be described.

In the present illustrative embodiment, before it is detected whether the stepping motor is out of step, in Step S101 and Step S102, the out-of-step detection threshold value based on the temperature information is set in advance. Then, based on the predetermined out-of-step detection threshold value, it is detected whether the stepping motor is out of step or not.

It has been found that the back electromotive voltage of the stepping motor 20 depends on the temperature of the stepping motor 20. Therefore, setting of the out-of-step detection threshold value is performed using temperature information on the temperature of the stepping motor 20 or on the temperature of the motor control device 10 corresponding to the temperature of the stepping motor 20. The motor control device 10 is often disposed in the same environment as that of the stepping motor 20, and performs an operation according to the operation of the stepping motor 20. Therefore, the temperature of the motor control device 10 corresponds to the temperature of the stepping motor 20. The out-of-step detection threshold value is set using that temperature information, and therefore, it becomes possible to more accurately detect out-of-step.

In the present illustrative embodiment, more specifically, the temperature measuring unit 128 acquires the temperature of the control circuit 12, that is, the internal temperature of the IC, as the temperature information. Here, the control circuit 12 is often disposed in a substantially same environment as that of the stepping motor 20. Also, the control circuit 12 operates according to the operation of the stepping motor 20. Therefore, the internal temperature of the IC substantially correlates with the environment where the stepping motor 20 is disposed (a situation such as an ambient temperature) or a load situation of the stepping motor 20. Therefore, the out-of-step detection threshold value according to the temperature is selected using the temperature information on the internal temperature of the IC, so that it becomes possible to more accurately detect out-of-step of the stepping motor 20.

If the temperature information is acquired by the temperature measuring unit 128, the CPU 122 sets the out-of-step detection threshold value according to the temperature information. At this time, the CPU 122 determines which temperature range of three preset temperature ranges (temperature ranges of three ranks) the temperature represented by the temperature information acquired by the temperature measuring unit 128 belongs to. Then, the CPU 122 sets a threshold value corresponding to one of the three temperature ranges determined to include the temperature of the temperature information from the three temperature ranges, as the out-of-step detection threshold value. The correspondence relation between each temperature range and the threshold value is set, for example, as a threshold value setting table, in advance. The threshold value setting table is stored, for example, in a storage unit (memory not shown) provided in the control circuit 12. However, the correspondence relation may be not determined by this threshold value setting table.

In the present illustrative embodiment, as the three temperature ranges, for example, three ranges of a first range equal to or lower than 5° C., a second range higher than 5° C. and lower than 75° C., and a third range equal to or higher than 75° C. are set. Further, the first range, the second range, and the third range correspond to threshold values $V_1$, $V_2$, and $V_3$ set as the out-of-step detection threshold value, respectively.

The CPU 122 determines which of the three temperature ranges (the first to third ranges) the temperature represented by the temperature information acquired by the temperature measuring unit 128 belongs to. Then, the CPU 122 selects a threshold value corresponding to a range determined to include the temperature, as the out-of-step detection threshold value.

As an example, it is assumed a case where the temperature represented by the temperature information acquired by the temperature measuring unit 128 is 50° C. In this case, the temperature belongs to the second range. Therefore, the threshold value $V_2$ corresponding to the second range is set as the out-of-step detection threshold value. The CPU 122 compares the set out-of-step detection threshold value $V_2$ with the value of the back electromotive voltage, thereby detecting whether out-of-step is occurred in the stepping motor 20.

Similarly, when the temperature represented by the temperature information acquired by the temperature measuring unit 128 is, for example, 0° C., the threshold value $V_1$ is selected as the out-of-step detection threshold value. Also, when the temperature is, for example, 100° C., the threshold value $V_3$ is selected as the out-of-step detection threshold value. In this manner, whether out-of-step is occurred in the stepping motor 20 is detected based on the out-of-step detection threshold value corresponding to the temperature of the stepping motor 20.

As the temperature ranges, for example, at least two ranges of a high temperature side and a low temperature side may be set, or more than three ranges may be set. As the temperature ranges, five stages, for example, a range equal to or lower than 5° C., a range from 5° C. to 45° C., a range from 45° C. to 60° C., a range from 60° C. to 75° C., and a range equal to or higher than 75° C. may be set, or seven stages or the like may be set.

[Effects]

According to the motor control device 10 configured as described above, the temperature corresponding to the temperature of the stepping motor 20 is measured, and the out-of-step detection threshold value is set according to the temperature acquired by the measuring. Then, the set out-of-step detection threshold value is compared with the separately measured back electromotive voltage, so that out-of-step is detected. The back electromotive voltage of the stepping motor 20 depends on the temperature, and in the motor control device 10, according to the temperature of the stepping motor 20, the out-of-step detection threshold value, that is the criterion of the back electromotive voltage detected at that time, is changed, and then it is possible to detect out-of-step. Therefore, even in a state where the stepping motor 20 is a relatively high or low temperature, it is possible to detect that out-of-step is occurred in the stepping motor 20, at high accuracy.

The out-of-step detection threshold value is set by selecting a threshold value associated with a temperature range where the temperature represented by the temperature information belongs. Therefore, it is possible to perform setting of the out-of-step detection threshold value by a relatively simple process.

Also, in the present illustrative embodiment, the out-of-step detection threshold value is set using the temperature measured by the temperature measuring unit 128 provided in the control circuit 12. As described above, it is possible to reduce the number of components of the motor control device 10 by using the 'function of measuring the internal temperature of the IC' conventionally used inside the control circuit 12 for motor control. Therefore, it is possible to suppress the manufacturing cost of the motor control device 10 to be low. Also, it is possible to reduce the motor control device 10 in size, and to reduce a space necessary for installing the motor control device 10. The internal temperature of the IC substantially correlates with the environment (ambient temperature) where the stepping motor 20 is disposed, or the load situation of the stepping motor 20. Since the temperature information on the internal temperature of the IC is used to set the out-of-step detection threshold value according to the temperature, it becomes possible to more accurately detect out-of-step.

Also, the measurement of the temperature is not limited to measurement using the temperature measuring unit 128 provided in the control circuit 12. For example, a separate temperature sensor may be used to measure the temperature of the stepping motor 20, the temperature of the motor control device 10, or the temperature of other portions.

[Modification]

Each temperature range may correspond to one threshold value as described above, or may correspond to two or more threshold values. For example, when using a plurality of threshold values to set the out-of-step detection threshold value, each threshold value may be obtained by a threshold value setting table.

Figure 4:
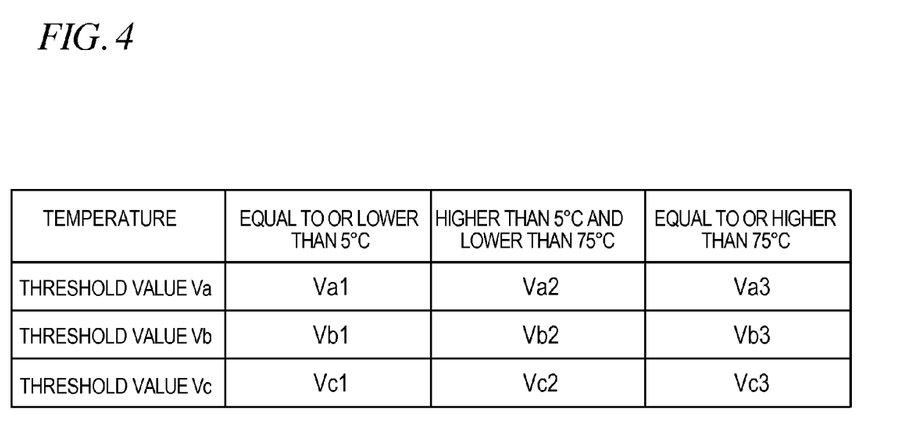
FIG. 4 is a view showing an example of a threshold value setting table.

FIG. 4 is a view showing an example of the threshold value setting table.

Also in FIG. 4, three temperature ranges of a first range equal to or lower than 5° C., a second range higher than 5° C. and lower than 75° C., and a third range equal to or higher than 75° C. are set. With respect to each temperature range, three threshold values (threshold values $V_a$, $V_b$, and $V_c$) are set.

Here, the threshold values $V_a$, $V_b$, and $V_c$ are, for example, as follow. That is, the threshold value $V_a$ is compared to the value of the measured back electromotive voltage. Also, the threshold value $V_b$ is compared to the absolute value of a variation of the back electromotive voltage between consecutive previous and next measuring timing. The threshold value $V_c$ is compared to a difference between the absolute values of consecutive variations in the back electromotive voltage in a period when the variations in the back electromotive voltage satisfying a predetermined condition.

The out-of-step detection criterion is set using those threshold values $V_a$, $V_b$, and $V_c$. That is, for example, as disclosed in JP-A-2009-261045, when any one of a plurality of conditions including that the value of the measured back electromotive voltage should satisfy a predetermined condition with respect to the threshold value $V_a$, that the absolute value of the variation of the back electromotive voltage should satisfy a predetermined condition with respect to the threshold value $V_b$, that the difference between the absolute values of the variations in the back electromotive voltage should satisfy a predetermined condition with respect to the threshold value $V_c$, and the like is satisfied, it may be determined that the out-of-step detection criterion is satisfied. Also, when a predetermined number of two or more conditions of the plurality of conditions including them are satisfied, or all of two or more specific conditions of the plurality of conditions are satisfied, it may be determined that the out-of-step detecting condition is satisfied.

In the example shown in FIG. 4, in the threshold value setting table, the first range corresponds to threshold values $V_{a1}$, $V_{b1}$, and $V_{c1}$ serving as the threshold values $V_a$, $V_b$, and $V_c$, respectively. Also, the second range corresponds to threshold values $V_{a2}$, $V_{b2}$, and $V_{c2}$. The third range corresponds to threshold values $V_{a3}$, $V_{b3}$, and $V_{c3}$. The CPU 122 selects each of the threshold values $V_a$, $V_b$, and $V_c$ corresponding to a temperature range determined to include the temperature represented by the temperature information acquired by the temperature measuring unit 128, and sets the out-of-step detection criterion. Therefore, even when using a relatively complex out-of-step detection criterion to detect out-of-step, it is possible to appropriately change the out-of-step detection criterion according to the measured temperature. Since the threshold value setting table is used, it is possible to set the out-of-step detection criterion by a relatively simple process.

Also, the CPU 122 may be configured to set the out-of-step detection criterion by various methods, in addition to the method of selecting a threshold value corresponding to a temperature range as described above. For example, the CPU 122 may be configured to use a calculation formula having a temperature as a parameter to obtain the out-of-step detection threshold value.

It is possible to represent an out-of-step detection threshold value V as a function F(t) having the internal temperature 't' of the IC as a parameter, for example, like the following equation, and to use the function F(t) to obtain the out-of-step detection threshold value V.

$$V=F(t)$$

Specifically, it is possible to use a mathematical expression represented, for example, like the following equation, to obtain the out-of-step detection threshold value V.

$$V=a*t^2+b*t+c \text{ ($a$, $b$, and $c$ are constant numbers)}$$

The above expression is an example, and the function F(t) may be represented as a high-dimensional function having a degree higher the second degree.

Since a calculation formula according to the dependence of the back electromotive voltage on the temperature is used to set the out-of-step detection threshold value, it is possible to set an out-of-step detection threshold value more appropriate for a variation in the temperature. Accordingly, it is possible to more accurately detect whether out-of-step is occurred in the stepping motor 20. Therefore, it becomes possible to more reliably detect whether the stepping motor is out of step.

[Others]

In the above-mentioned illustrative embodiment, during stop of the control current of a coil of each phase, the other coil is set to a fixed voltage, and measuring of the back electromotive voltage is performed. However, the present invention is not limited thereto. In the stop period of the control current of a coil of a phase, the back electromotive voltage of the coil may be measured, regardless of whether to set the other coil to the fixed voltage. Also, the back electromotive voltage may be appropriately measured at various timings.

Only a portion of the control circuit may be configured as an integrated circuit. Also, in the motor control device, a part of a portion different from the control circuit may be configured as an integrated circuit. The entire motor control device may be configured as an integrated circuit.

The stepping motor is not limited to a 2-phase stepping motor. For example, the stepping motor may be a 5-phase stepping motor.

The hardware configuration of the motor drive device such as the stepping motor, the motor control device, and the like is not limited to the above-mentioned configuration. The configuration of the motor drive device can be appropriately changed such that the motor control device performs a function of detecting out-of-step as described above.

The processes in the above-mentioned illustrative embodiment may be performed by software or by using a hardware circuit.

It is possible to provide a program for performing the processes in the above-mentioned illustrative embodiment, and it is also possible to record the program in a recording medium such as a CP-ROM, a flexible disk, a hard disk, a ROM, a RAM, or a memory card, and to provide the recording medium to a user. The program may be downloaded into a device through a communication line such as the Internet. According to the program, the processes described by sentences in the above-mentioned flow chart may be performed by the CPU or the like.

It should be understood that the illustrative embodiments disclosed herein are illustrative and non-restrictive in every aspect. The scope of the present invention is defined by the terms of the claims, rather than by the description above, and is intended to include any modifications within the scope and meaning equivalent to the terms of the claims.

What is claimed is:

1. A motor control device for controlling an energization state of a coil of each phase for driving a stepping motor having multiple phase coils, the motor control device comprising:
   a measuring unit configured to measure a back electromotive voltage induced at a coil of a phase for which energization is stopped, among the multiple phase coils;
   an acquiring unit configured to acquire temperature information on temperature of the stepping motor or on temperature corresponding to the temperature of the stepping motor; and
   a detecting unit configured to detect whether the stepping motor is out of step or not based on a result obtained by the measuring unit and the temperature information acquired by the acquiring unit, wherein the detecting unit comprises:
   a setting unit configured to set a detection criterion regarding out-of step of the stepping motor according to the temperature information acquired by the acquiring unit; and
   a comparing unit configured to compare between the result obtained by the measuring unit and the detection criterion set by the setting unit;
   and wherein the detecting unit is configured to perform detection based on a result obtained by the comparing unit.

2. The motor control device according to claim 1, wherein a portion of the motor control device or the entire motor control device configures a control circuit, and wherein temperature of the control circuit is acquired as the temperature information by the acquiring unit.

3. The motor control device according to claim 2, wherein the control circuit is an integrated circuit.

4. The motor control device according to claim 1, wherein the setting unit is configured to determine which one of at least two preset temperature ranges the temperature represented by the temperature information belongs to, and configured to set the detection criterion using a threshold value corresponding to the temperature range determined to include the temperature represented by the temperature information.

5. The motor control device according to claim 1, further comprising:
   a stopping unit configured, when a direction of a coil current flowing in a coil of a phase of the multiple phase coils is switched, to temporarily stops application of a voltage to the coil,
   wherein in a stop period when the application of the voltage is stopped by the stopping unit, a back electromotive voltage induced at the coil is measured by the measuring unit.

6. An out-of-step detecting method of a stepping motor having multiple phase coils, the method comprising:
   measuring a back electromotive voltage induced at a coil of a phase for which energization is stopped, among the multiple phase coils;
   acquiring temperature information on temperature of the stepping motor, or temperature corresponding to the temperature of the stepping motor; and
   detecting whether the stepping motor is out of step or not based on a result obtained by the measuring step and the acquired temperature information, wherein the detecting step comprises:
   setting a detection criterion regarding out-of step of the stepping motor according to the temperature information acquired by the acquiring step; and
   comparing between the result obtained by the measuring step and the detection criterion set by the setting step;
   wherein the detecting step detects whether the stepping motor is out of step based on a result obtained by the comparing step.

* * * * *